(12) United States Patent
Kurata et al.

(10) Patent No.: US 6,971,246 B2
(45) Date of Patent: Dec. 6, 2005

(54) VEHICLE AIR CONDITIONER WITH FRONT AND REAR AIR CONDITIONING UNITS

(75) Inventors: Shun Kurata, Kariya (JP); Yoshiaki Takano, Kosai (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/685,774

(22) Filed: Oct. 15, 2003

(65) Prior Publication Data
US 2004/0074246 A1  Apr. 22, 2004

(30) Foreign Application Priority Data
Oct. 21, 2002  (JP)  ............................. 2002-305863

(51) Int. Cl.[7] ............................................. F25B 41/00
(52) U.S. Cl. .................. 62/196.4; 62/244; 62/503
(58) Field of Search ............................. 62/175, 196.4, 62/199, 200, 244, 503, 512, 509; 137/533, 137/540

(56) References Cited

U.S. PATENT DOCUMENTS

| | | | | |
|---|---|---|---|---|
| 4,611,374 A | * | 9/1986 | Schnelle et al. | 29/890.13 |
| 5,044,169 A | * | 9/1991 | Inoue | 62/196.4 |
| 5,088,304 A | * | 2/1992 | Schlichtig | 62/510 |
| 5,139,047 A | * | 8/1992 | Reinicke | 137/543.21 |
| 6,131,652 A | * | 10/2000 | Ito et al. | 165/204 |
| 6,318,116 B1 | * | 11/2001 | Gabel et al. | 62/475 |
| 6,430,945 B1 | * | 8/2002 | Haussmann | 62/117 |
| 6,491,578 B2 | * | 12/2002 | Yoshinori et al. | 454/139 |
| 6,516,628 B2 | * | 2/2003 | Izawa et al. | 62/509 |

FOREIGN PATENT DOCUMENTS

| | | | | |
|---|---|---|---|---|
| JP | 355123516 A | * | 9/1980 | |
| JP | 358026617 A | * | 2/1983 | |
| JP | 358056911 | * | 4/1983 | |
| JP | 407025229 A | * | 1/1996 | |
| JP | 02000272323 A | * | 10/2000 | |
| JP | 2001-130245 | | 5/2001 | |

* cited by examiner

Primary Examiner—Mohammad M. Ali
(74) Attorney, Agent, or Firm—Harness, Dickey & Pierce, PLC

(57) ABSTRACT

In a vehicle air conditioner having front and rear air conditioning units, a refrigerant cycle includes front and rear evaporators for cooling air in a cooling mode, a hot-gas bypass passage through which hot-gas refrigerant discharged from a compressor flows into the front evaporator while bypassing a condenser in a heating mode, and a fixed throttle between the condenser and the front evaporator for decompressing refrigerant flowing from the condenser in the cooling mode. Further, a refrigerant outlet side of the fixed throttle and a refrigerant outlet side of the hot-gas bypass passage are joined to a refrigerant pipe, and a refrigerant outlet of the refrigerant pipe is connected to a refrigerant inlet of the front evaporator. Therefore, a refrigerant pipe structure of the refrigerant cycle can be made simple.

17 Claims, 6 Drawing Sheets

VEHICLE AIR CONDITIONER WITH FRONT AND REAR AIR CONDITIONING UNITS

CROSS REFERENCE TO RELATED APPLICATION

This application is based on and incorporates herein by reference Japanese Patent Application No. 2002-305863 filed on Oct. 21, 2002.

FIELD OF THE INVENTION

The present invention relates to a dual-type vehicle air conditioner with front and rear air conditioning units each of which has a cooling evaporator. In a heating mode, gas refrigerant (hot-gas) discharged from a compressor is directly introduced into the evaporator of the front air conditioning unit.

BACKGROUND OF THE INVENTION

In a dual-type vehicle air conditioner described in JP-A-2001-130245, in order to adjust the flow rate of refrigerant in response to the thermal load in front and rear evaporators, front and rear thermal expansion valves are used as decompression units. Each of the thermal expansion valves has a sensing portion for detecting a degree of super heating of the refrigerant discharged from each evaporator. When the thermal expansion valve is disposed in an engine compartment, the sensing portion may be affected by engine heat and hot air in the engine compartment. Therefore, the thermal expansion valve needs to be disposed in a passenger compartment, adjacent to the evaporator.

On the other hand, the compressor is disposed in the engine compartment. To send hot-gas refrigerant from the compressor to the front evaporator, a hot-gas refrigerant passage needs to extend from a refrigerant discharge side of the compressor in the engine compartment to a refrigerant passage between the front expansion valve and the front evaporator in the passenger compartment. As a result, the hot-gas refrigerant passage becomes lengthened. Further, refrigerant piping structure in the engine compartment becomes complicated, and it becomes difficult to ensure the arrangement space of the refrigerant piping.

SUMMARY OF THE INVENTION

The present invention has been made in view of the above-mentioned problems and the object thereof is for simplifying a piping structure in a dual-type vehicle air conditioner having a hot-gas heater function.

In a dual-type vehicle air conditioner having a front air conditioning unit and a rear air conditioning unit of the present invention, a refrigerant cycle includes a compressor for compressing refrigerant, a condenser for condensing gas refrigerant discharged from the compressor in a cooling mode, a front evaporator disposed in the front air conditioning unit for cooling air in the cooling mode and for heating air in a heating mode, a rear evaporator disposed in the rear air conditioning unit for cooling air in the cooling mode, a hot-gas bypass passage through which the gas refrigerant discharged from the compressor flows into the front evaporator while bypassing the condenser in the heating mode, a decompression unit disposed between the condenser and the front evaporator for decompressing refrigerant flowing from the condenser in the cooling mode, and a refrigerant pipe to which a refrigerant outlet side of the decompression unit and a refrigerant outlet side of the hot-gas bypass passage are joined. Further, the refrigerant pipe has a refrigerant outlet that is connected to a refrigerant inlet of the front evaporator. Accordingly, a refrigerant pipe structure of the refrigerant cycle can be made simple.

For example, the condenser includes first and second heat-exchanging units which are disposed in this order in a refrigerant flow direction, and a high-pressure gas-liquid separator disposed between the first heat-exchanging unit and the second heat-changing unit for separating refrigerant into gas refrigerant and liquid refrigerant. In this case, the high-pressure gas-liquid separator is disposed such that an amount of the liquid refrigerant stored in the gas-liquid separator is changed in accordance with a superheating degree of the gas refrigerant discharged from the compressor. Accordingly, even when the decompression unit is a fixed throttle, the refrigerant flow in the refrigerant cycle can be accurately adjusted without relative to thermal condition around the decompression unit.

In addition, the refrigerant cycle includes a low-pressure gas-liquid separator for separating refrigerant into gas refrigerant and liquid refrigerant. In this case, the low-pressure gas-liquid separator is coupled to a refrigerant outlet of the front evaporator and a refrigerant outlet of the rear evaporator. Further, the low-pressure gas-liquid separator has a refrigerant outlet portion through which gas refrigerant is introduced to a suction port of the compressor.

Preferably, the refrigerant cycle includes an evaporator outlet pipe having one end connected to the refrigerant outlet of the rear evaporator and the other end connected to the low-pressure gas-liquid separator, and a check valve disposed in the evaporator outlet pipe, for preventing a reverse flow from the low-pressure gas-liquid separator toward the rear evaporator. In this case, the evaporator outlet pipe has a wall portion defining a reduced passage area, and the check valve has a valve body that contacts the wall portion when a refrigerant flow from the gas-liquid separator toward the rear evaporator is shut. Therefore, the structure of the check valve can be made simple. More preferably, an engagement portion is provided in the valve body, and the engagement portion is engaged with the wall portion to regulate an opening degree of the check valve when the valve body is moved to a valve-opening position.

Alternatively, the evaporator outlet pipe includes a first pipe portion connected to the refrigerant outlet of the rear evaporator, and a second pipe portion connected to the low-pressure gas-liquid separator. In this case, a check valve is disposed between the first pipe portion and a second pipe portion to be connected therebetween, for preventing a reverse flow from the low-pressure gas-liquid separator toward the rear evaporator. Even in this case, the connection structure of the check valve can be made simple.

BRIEF DESCRIPTION OF THE DRAWINGS

The above and other objects, features and advantages of the present invention will become more apparent from the following detailed description made with reference to the accompanying drawings, in which.

DETAILED DESCRIPTION OF PREFERRED EMBODIMENTS (First Embodiment)

The first embodiment of the present invention will be now described with reference to FIGS. 1–3. In the first embodiment, the present invention is typically applied to a dual-type air conditioner for a vehicle having a wide passenger compartment space, such as one-box type recreational vehicle (RV).

Figure 1:
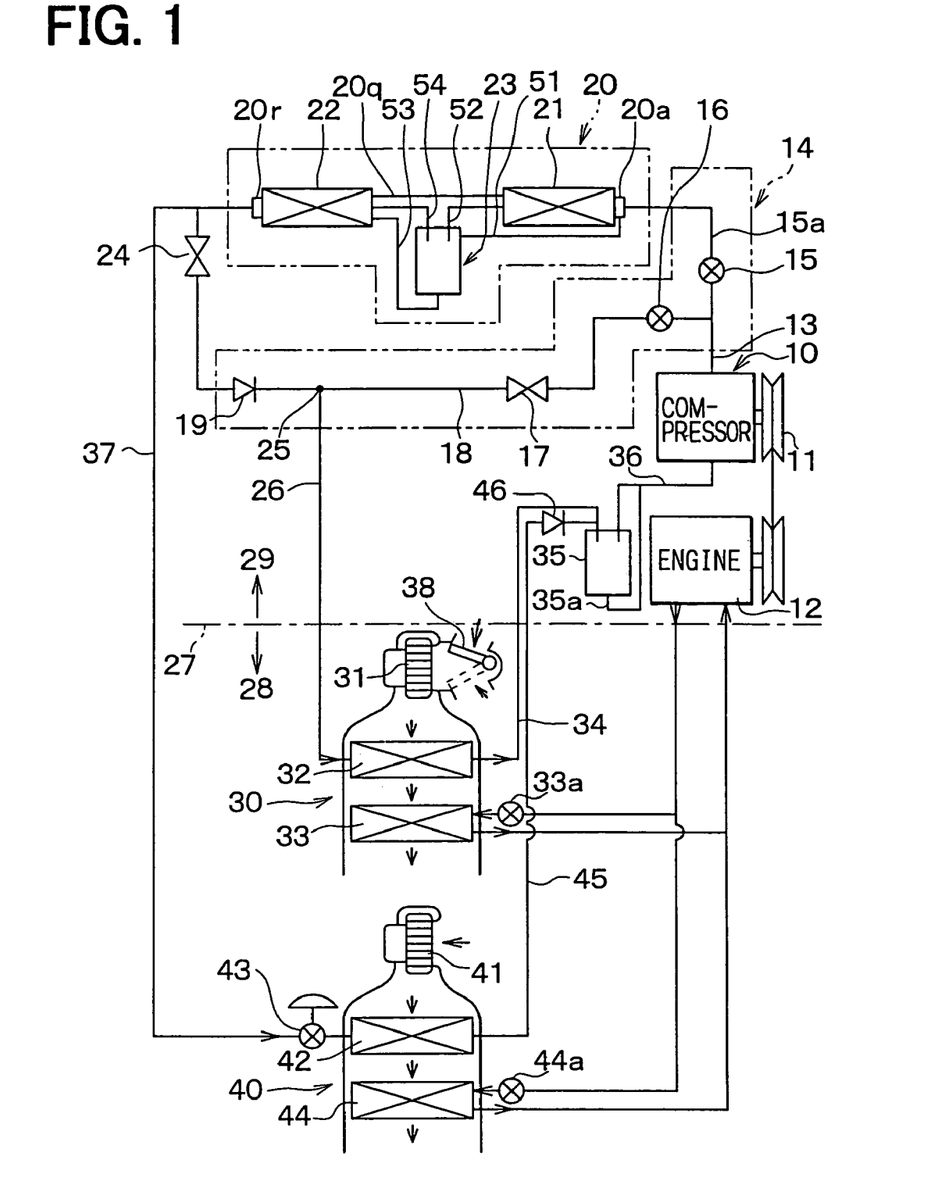
FIG. 1 is a schematic diagram showing a dual-type vehicle air conditioner, according to a first embodiment of the present invention.
Figure 2:
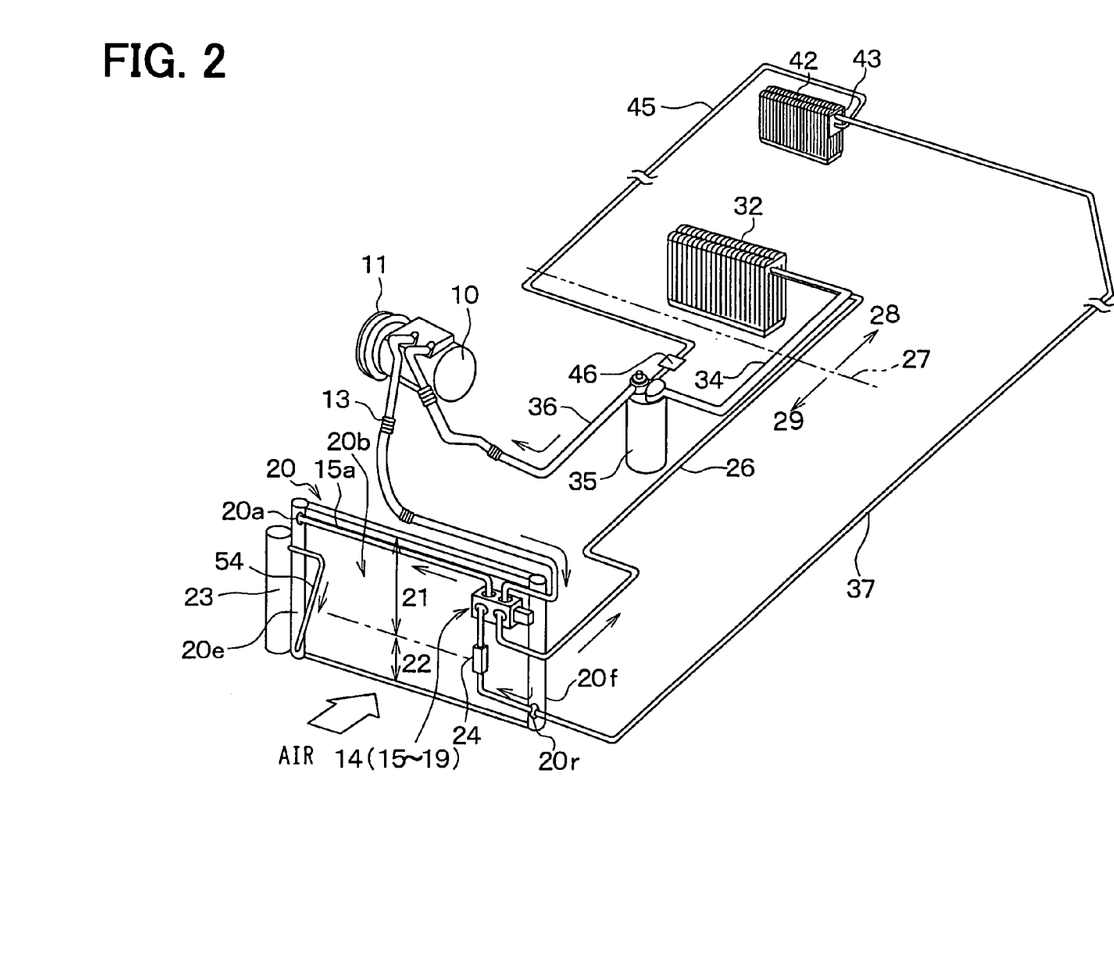
FIG. 2 is a schematic diagram showing a mounting state of a refrigerant cycle on the vehicle in the dual-type vehicle air conditioner according to the first embodiment.

As shown in FIG. 1 and FIG. 2, the dual-type air conditioner has a front air conditioning unit 30 for performing an air conditioning in a front seat area of a passenger compartment 28, and a rear air conditioning unit 40 for performing an air-conditioning in a rear seat area of the passenger compartment 28. The front air conditioning unit 30 is disposed inside of a dashboard (not shown) at the forefront of the passenger compartment 28. The rear air conditioning unit 40 is disposed in a sidewall of a vehicle body, adjacent to the right sidewall portion or the left sidewall portion of the passenger compartment 28 on the rear seat side.

A compressor 10 is driven by a vehicle engine 12 via an electromagnetic clutch 11. A valve device 14 is connected with a discharge pipe 13 of the compressor 10. The valve device 14 is an integrated unit including a cooling solenoid valve 15 used in a cooling mode, a heating solenoid valve 16 used in a heating mode, a heating decompression unit 17, a hot-gas bypass passage 18 and a high-pressure side check valve 19.

The heating solenoid valve 16 and the heating decompression unit 17 are provided in the hot-gas bypass passage 18 through which hot-gas refrigerant discharged from the compressor 10 bypasses a condenser 20. The heating decompression unit 17 can be structured with a fine radial throttle hole (fixed throttle).

The discharge pipe 13 of the compressor 10 is connected to an inlet joint 20a of the condenser 20 through the cooling solenoid valve 15 and an outlet piping 15a from the cooling solenoid valve 15. Here, the condenser 20 cools and condenses a high-pressure gas refrigerant discharged from the compressor 10 by performing heat-exchange with outside air. The condenser 20 has a first heat-exchanger portion 21 and a second heat-exchanger portion 22 which are provided in this order in the refrigerant flowing direction in the condenser 20. A high-pressure side gas-liquid separator 23 for separating refrigerant into a gas refrigerant and a liquid refrigerant is disposed between the first heat-exchanger portion 21 and the second heat-exchanger portion 22.

Figure 3:
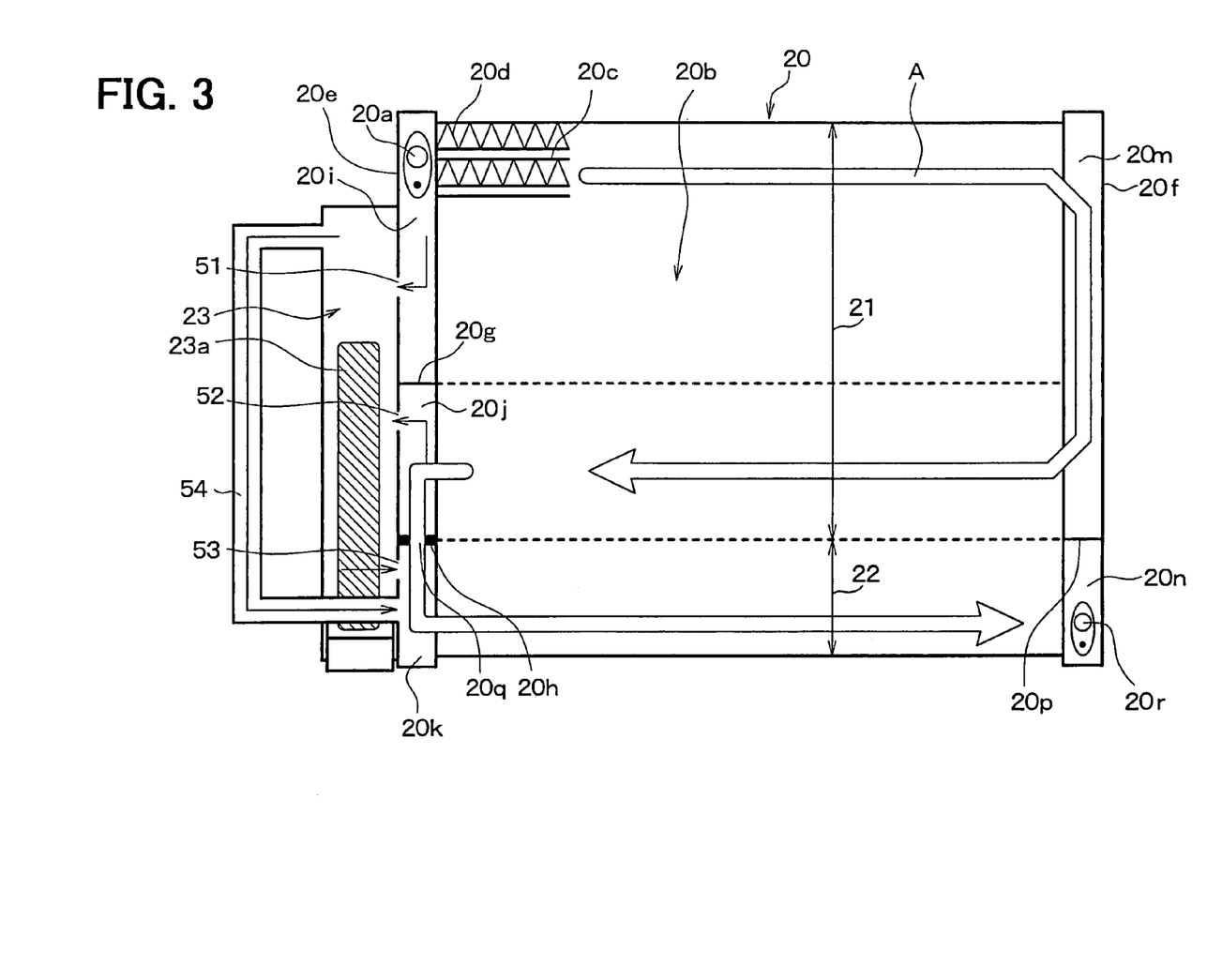
FIG. 3 is a schematic sectional view showing a refrigerant flow in a condenser of the refrigerant cycle according to the first embodiment.

As shown in FIG. 3, in a heat-exchanging portion 20b of the condenser 20, a plurality of flat tubes 20c are disposed horizontally, and are alternatively stacked with a plurality of corrugated fins 20d in a vertical direction. The refrigerant flows through the tubes 20c to perform heat-exchange with air. A first header tank 20e and a second header tank 20f extending vertically are respectively disposed at two horizontal ends of the tubes. Both the ends of the tubes 20c communicate the inner spaces of the header tanks 20e, 20f, respectively.

The high-pressure side gas-liquid separator 23 is integrated with the first header tank 20e by soldering or the like. The gas-liquid separator 23 is formed into a cylindrical shape extending in a vertical direction. The gas-liquid separator 23 separates the high-pressure refrigerant into a gas refrigerant and a liquid refrigerant by using the difference in density between the liquid refrigerant and the gas refrigerant, and accumulates the liquid refrigerant in the lower part of a tank portion.

First and second partition plates 20g, 20h partitions the inner space of the first header tank 20e into an upper space 20i, an intermediate space 20j and a lower space 20k. An inlet joint 20a is provided in the upper space 20i of the first header tank 20e. A third partition plate 20p partitions the inner space of the second header tank 20f into an upper space 20m and a lower space 20n. The second partition plate 20h in the first header tank 20e and the third partition plate 20p in the second header tank 20f are provided at the same height positions. On the upper side of the partition plates 20h and 20p, the first heat-exchanger portion 21 is constructed. On the lower side of the partition plates 20h and 20p, a second heat-exchanger portion 22 is constructed. In the second partition plate 20h, a throttle hole 20q is provided through which the intermediate space 20j communicates with the lower space 20k in the first header tank 20e.

The upper space 20i of the first header tank 20e directly communicates with the inside of the gas-liquid separator 23 through a first communication path 51. The middle space 20j of the first header tank 20e directly communicates with the inside of the gas-liquid separator 23 through a second communication path 52.

The lower space of the gas-liquid separator 23 communicates with the lower space 20k of the first header tank 20e through a liquid return communication path 53, at a position around the bottom surface of the gas-liquid separator 25. Furthermore, the upper space of the gas-liquid separator 23 communicates with the lower space 20k of the first header tank 20e through a gas return communication passage 54. An outlet joint 20r is provided in the lower space 20n of the second header tank 20f. A drying agent 23a is disposed for absorbing moisture in the refrigerant inside the gas-liquid separator 23.

The first communication path 51, the second communication path 52 and the liquid return communication path 53 can be easily formed by through holes penetrating through the wall between the first header tank 20e and the gas-liquid separator 23. The gas return communication passage 54 can be constructed with a pipe member. However, the gas return communication passage 54 can be formed as a vertically extended communication passage on the cylindrical wall of the gas-liquid separator 23.

Refrigerant discharged from the compressor 10 (FIG. 1) flows into the condenser 20 from the inlet joint 20a, and passes through the upper side tubes of the first heat-exchanger portion 21 after passing through the upper space 20i of the first header tank 20e. Then, the refrigerant having passed through the upper side tubes of the heat-exchanging portion 21 flows into the upper space 20m of the second header tank 20f. The refrigerant introduced into the upper space 20*i* of the first header tank 20*e* is partially divided, and the divided refrigerant directly flows into the upper portion of the gas-liquid separator 23 through the first communication path 51.

Inside of the upper space 20*m* of the second header tank 20*f*, the refrigerant U-turns so that the refrigerant flows into the intermediate space 20*j* of the first header tank 20*e* through the lower tubes in the first heat-exchanger portion 21. In a normal operation, while the refrigerant passes the upper tubes and the lower tubes of the first heat-exchanger portion 21, the refrigerant radiates heat to air (i.e., outside air), and is condensed. The condensed refrigerant flows into the intermediate space 20*j* of the first header tank 20*e*.

Main stream of liquid refrigerant in the intermediate space 20*j* of the first header tank 20*e*, passes through the throttle hole 20*q* of the second partition plate 20*h* and flows into the lower space 20*k* in the first header tank 20*e*. A refrigerant flow is restricted in the throttle hole 20*q*, so that, a pressure loss is generated. Therefore, refrigerant in the intermediate space 20*j* of the first header tank 20*e* directly flows into the gas-liquid separator 23 via the second communication path 52.

Gas refrigerant in the upper portion of the gas-liquid separator 23 flows into the lower space 20*k* of the first header tank 20*e* through the gas return communication passage 54. Simultaneously, refrigerant including oil accumulated in the bottom area of the gas-liquid separator 23 flows into the lower space 20*k* through the liquid return communication path 53. Thus, the liquid refrigerant form the intermediate space 20*j* (main stream), the gas refrigerant from the gas return communication passage 54 and the liquid refrigerant from the liquid return communication path 53 are mixed in the lower space 20*k* of the first header tank 20*e*. Accordingly, the refrigerant in the lower space 20*k* of the first header tank 20*e* passes through the tubes of the second heat-exchanger portion 22 and is cooled again to be super cooled. The super cooled refrigerant flows into the lower space 20*n* of the second header tank 20*f* and flows out of the condenser 20 from the outlet joint 20*r*.

As shown in FIG. 2, the outlet piping 15*a* of the cooling solenoid valve 15 in the valve device 14 is fixed to the inlet joint 20*a* so that all of the valve device 14 is supported by the inlet joint 20*a*. Here, the valve device 14 can be fixed to an upper side plate of the condenser 20 with a bracket.

A front cooling decompression unit 24 and a high-pressure liquid refrigerant pipe 37 extending toward the rear evaporator 42 are connected to the outlet joint 20*r* of the condenser 20. The front cooling decompression unit 24 is a fixed throttle for decompressing the refrigerant having passed through the condenser 20 in a gas-liquid two-phase state. In this embodiment, specifically, the fixed throttle is a capillary tube that has a fine diameter (e.g., about Ø1.2~1.3 mm) and generates a pressure drop corresponding to a predetermined length thereof.

As shown in FIG. 1, a check valve 19 is connected to the outlet of the front cooling decompression unit 24. The check valve 19 prevents a reverse flow of a refrigerant from the hot-gas bypass passage 18 toward the condenser 20 in the heating mode. The outlet of the check valve 19 is joined with the outlet of the hot-gas bypass passage 18 inside the valve device 14 at a joint portion 25. Therefore, the hot-gas bypass passage 18 can be construct red with a short passage provided in the valve device 14 adjacent to the condenser 20. The joint portion 25 between the outlet of the hot-gas bypass passage 18 and the outlet of the check valve 19 can be provided inside the valve device 14.

At the joint portion 25, a low-pressure refrigerant pipe 26 is joined. The low-pressure refrigerant pipe 26 connected to the joint portion 25 is installed to extend from the engine compartment 29 toward the passenger compartment 28 through the opening of a partition wall 27. Hear, the partition wall 27 partitions the engine compartment 29 and the passenger compartment 28 from each other.

A front air conditioning unit 30 is disposed inside the dashboard (instrument panel) at the front portion of the passenger compartment. A front blower 31 for blowing air toward a front seat area in the passenger compartment 28 is accommodated in the front air conditioning unit 30. On the air suction side of the front blower 31, a switching door 38 is rotatably disposed for selectively introducing inside air (i.e., air inside the passenger compartment 28) and outside air (i.e., air outside the passenger compartment 28).

A front evaporator 32 for cooling air to be blown toward the front seat area of the passenger compartment 28 is disposed at a downstream of the front blower 31. The low-pressure refrigerant pipe 26 is connected to the refrigerant inlet of the front evaporator 32. A front heater core 33 for heating air to be blown toward the front seat area is disposed at a downstream of the front evaporator 32 in the air flow direction.

The rear air conditioning unit 40 is disposed at the rear side of the passenger compartment 28. The rear air conditioning unit 40 has a structure similar to the front air conditioning unit 30, and has a rear blower 41 for blowing air toward a rear seat area in the passenger compartment 28. The suction side of the rear blower 41 is opened to the passenger compartment 28 so that inside air is always introduced. A rear evaporator 42 for cooling air is disposed at the downstream of the rear blower 41. A rear thermal expansion valve 43 is connected at a refrigerant inlet of the rear evaporator 42. The rear high-pressure liquid refrigerant pipe 37 is connected at the inlet of the thermal expansion valve 43.

The thermal expansion valve 43 senses a superheating degree of the outlet refrigerant from the rear evaporator 42. The thermal expansion valve 43 controls its opening (a refrigerant flow) so that the superheating degree of the outlet refrigerant becomes to a predetermined value (for example, approximately 3° C.–15° C.). A rear heater core 44 for heating air to be blown toward the rear seat area is disposed on a downstream side of the rear evaporator 42 in the air flow direction.

Low-pressure side refrigerant outlet pipes 34, 45 are connected to the outlets of the front evaporator 32 and the rear evaporator 42, respectively. The refrigerant outlet pipes 34, 45 are installed to extend from the passenger compartment 28 to the engine compartment 29 through the partition wall 27, and are connected with the inlet of the low-pressure side gas-liquid separator 35 provided in the engine compartment 29. Adjacent to the outlet of the refrigerant outlet pipe 45, a low-pressure check valve 46 is disposed to prevent a reverse flow of the refrigerant from the gas-liquid separator 35 toward the rear evaporator 42 in the heating mode.

An outlet of the gas-liquid separator 35 is connected to a suction inlet of the compressor 10 through a suction piping 36. In the heating mode, the gas-liquid separator 35 separates the refrigerant from the front refrigerant outlet pipe 34 into gas refrigerant and liquid refrigerant, and accumulates the liquid refrigerant therein. The separated gas refrigerant is introduced to the compressor 10.

In the gas-liquid separator 35, a liquid return throttle path 35*a* is provided so that the liquid refrigerant around the bottom of the gas-liquid separator 35 is partially introduced to the compressor 10. The liquid return throttle path 35a is provided for introducing oil contained in the liquid refrigerant to the compressor 10, similarly to the liquid return communication path 53 of the condenser 20.

The low-pressure side gas-liquid separator 35 is used in combination with the high-pressure side gas-liquid separator 23 of the condenser 20. The gas-liquid separator 35 is used for gas-liquid separating and for accumulating of the liquid refrigerant only in the heating mode. On the contrary, in the cooling mode, the gas-liquid separator 23 is used for gas-liquid separating and for accumulating the liquid refrigerant. In the cooling mode, a super-heated gas refrigerant flows through the gas-liquid separator 35 from the evaporators 32, 42. Therefore, in the cooling mode, the gas-liquid separator 35 is only used as a simple passage through which the super-cooled gas refrigerant passes.

In the cooling mode (or, in a dehumidifying mode), the front evaporator 32 cools air blown from the front blower 31 by absorbing the evaporator latent heat from air. In the heating mode in winter, high-temperature gas refrigerant (hot gas) flows into the front evaporator 32 through the hot-gas bypass passage 18 so that the front evaporator 32 heats air as a radiator. On the other hand, the rear evaporator 42 of the rear air conditioning unit 40 has only a cooling function in the cooling mode, and does not work as a heat radiator.

The front heater core 33 and the rear heater core 44 are respectively connected with a hot-water circuit of the engine 12 via a front hot-water valve 33a and rear hot-water valve 44a. Hot water (i.e., engine cooling water) from the engine 12 circulates to the heater cores 33, 44 by an engine-driven hot-water pump (not shown) via the front hot-water valve 33a and the rear hot-water valve 44a. Thus, the heater cores 33, 44 heat air after passing through the evaporators 32, 44 using the hot water as a heat source.

In the front air conditioning unit 30, conditioned air is blown from a front air outlet downstream from the heater core 33, toward the front seat area in the passenger compartment 28. Similarly, in the rear air conditioning unit 40, conditioned air is blown from a rear air outlet downstream from the rear heater core 44, toward the rear seat area in the passenger compartment 28.

Electric devices such as the electromagnetic clutch 11, the cooling solenoid valve 15, the heating solenoid valve 16, a cooling fan for blowing air toward condenser 20, the front blower 31 and the rear blower 41 are controlled by an air-conditioning control system (ECU).

When the cooling mode is selected, the air-conditioning control system (not shown) controls the cooling solenoid valve 15 to be opened, and the heating solenoid valve 16 to be closed. Furthermore, the electromagnetic clutch 11 is energized to be connected so that the compressor 10 is driven by the engine 12.

In the cooling mode, the front air conditioning unit 30 and the rear air conditioning unit 40 are simultaneously running, and both of the front blower 31 and the rear blower 41 are activated so that air is blown in both the front air conditioning unit 30 and the rear air conditioning unit 40.

When the compressor 10 operates, gas refrigerant discharged from the compressor 10 passes through the opened cooling solenoid valve 15, and circulates in a closed refrigerant cycle made up with the condenser 20, the decompression unit 24 (fixed throttle), the check valve 19, the front evaporator 32, the gas-liquid separator 35 and the compressor 10 in this order. Simultaneously, the high-pressure refrigerant from the condenser 20 is divided and partially flows through the high-pressure liquid refrigerant pipe 37. The high-pressure refrigerant passes through the thermal expansion valve 43, which is a decompression device of the rear air conditioning unit 40. The refrigerant from the thermal expansion valve 43 flows through the rear evaporator 42, the check valve 46 and the gas-liquid separator 35, and is sucked into the compressor 10.

The low-pressure refrigerant decompressed in the decompression unit (fixed throttle) 24 evaporates in the front evaporator 32 to cool air blown from the front blower 31. Simultaneously, the low-pressure refrigerant decompressed in the thermal expansion valve 43 evaporates at the rear evaporator 42 to cool air blown from the rear blower 41. As a result, the air cooled by the front evaporator 32 and the rear evaporator 42 is blown toward the front seat area and the rear seat area of the passenger compartment 28 so that the passenger compartment 28 is cooled.

A refrigerant amount flowing into the rear evaporator 42 is controlled by the thermal expansion valve 43 so that the outlet refrigerant of the rear evaporator 42 is kept at a predetermined superheating degree (for example, 10° C.). Contrarily, the front decompression unit 24 is a fixed throttle. Even when the fixed throttle is used as the front decompression unit 24, the refrigerant flow in the front refrigerant cycle can be controlled so that the outlet refrigerant of the front evaporator 32 has a predetermined superheating degree. That is, the gas refrigerant discharged from the compressor 10 is introduced into the inlet joint 20a, and partially flows into the gas-liquid separator 23 from the first communication path 51. A part of liquid refrigerant condensed in the first heat-exchanger portion 21 partially flows into the gas-liquid separator 23 from the second communication path 52. The gas refrigerant discharged from the compressor 10 and the liquid refrigerant condensed in the first heat-exchanger portion 21 are mixed in the gas-liquid separator 23 to perform heat-exchange therebetween. Thus, the mixture refrigerant becomes in a gas-liquid two-phase state which has a dryness in accordance with a superheat degree of the gas refrigerant discharged from the compressor 10.

As a result, the amount of the liquid refrigerant accumulated in the gas-liquid separator 23 corresponds to the superheating degree of the gas refrigerant discharged from the compressor 10. In another word, the amount of the accumulated liquid refrigerant in the gas-liquid separator 23 can be controlled in accordance with a change of the superheating degree of the gas refrigerant discharged from the compressor 10. By controlling of the accumulated amount of the liquid refrigerant in the gas-liquid separator 23, a refrigerant circulation amount in the refrigerant cycle is controlled and superheating degree of gas refrigerant in the outlet of the compressor 10 can be controlled. In principle, the compression process of the refrigerant in the compressor 10 is basically an isentropic change due to adiabatic compression. If the superheating degree of the gas refrigerant discharged from the compressor 10 is controlled, the superheating degree of refrigerant sucked to the compressor 10, that is, the superheating degree of refrigerant at the outlet of the front evaporator 32 can be controlled indirectly. As a result, even when the decompression unit 24 is the fixed throttle, which is simpler than the thermal expansion valve, the refrigerant from the front evaporator 32 can be kept at the predetermined superheating degree by controlling of superheating degree of the gas refrigerant discharged from the compressor 10 in the gas-liquid separator 23.

When no passenger is on the rear seat of the passenger compartment in the cooling mode, the operation of the rear air conditioning unit 40 is stopped, and the front air conditioning unit 30 is individually operated. In this case, only the front blower 31 is operated and the rear blower 41 is stopped. Thus, refrigerant evaporation in the rear evaporator 42 is reduced to a minimum degree, and the thermal expansion valve 43 shuts its valve opening by its spring. In substance, the refrigerant flow toward the rear evaporator 42 is terminated, so that air conditioning is performed for only the front seat side individually.

Even when only the front air conditioning unit is operated, the check valve 46 prevents a reverse flow of the refrigerant from the front evaporator 32 toward the rear evaporator 42, and it can restrict refrigerant (liquid refrigerant) from staying in the rear evaporator 42 (sleeping phenomenon).

In the heater mode in winter, the air conditioning control system controls the cooling solenoid valve 15 to be closed, and the heating solenoid valve 16 to be opened so that the hot-gas bypass passage 18 is opened. Thus, a high-temperature gas refrigerant discharged from the compressor 10 passes through the opened heating solenoid valve 16. Subsequently, the hot gas refrigerant is decompressed at the heating decompression unit (fixed throttle) 17.

The decompressed gas refrigerant is introduced into the front evaporator 32 of the front air conditioner 30 through the hot-gas bypass passage 18 and the refrigerant inlet pipe 26. The front evaporator 32 heats air blown from the front blower 31. The refrigerant after being radiated in the front evaporator 32 flows into the gas-liquid separator 35, to be separated into the gas refrigerant and the liquid refrigerant by using the density difference thereof. The separated gas refrigerant is sucked to the compressor 10 and is compressed again. Simultaneously, liquid refrigerant including oil in the bottom area of the gas-liquid separator 35 is sucked to the compressor 10 through the oil-returning passage 35a (liquid return throttle passage) by a certain quantity.

In the heating mode, the check valve 19 prevents a reverse flow of refrigerant from the hot-gas bypass passage 18 toward the condenser 20, and thereby preventing the refrigerant from staying in the condenser 20 (sleeping phenomenon).

In this embodiment, the front evaporator 32 has the hot-gas heater function, but the rear evaporator 42 does not have the hot-gas heater function, by the following reason.

In the front air conditioning unit 30, inside air and outside air (fresh air) can be switched to be introduced therein. In the heating mode in winter, an outside air introduction mode is selected for defogging the window. In this case, due to introduction of low-temperature outside air, thermal load of the front air conditioning unit 30 becomes extremely larger than that of the rear air conditioning unit 40 which introduces only inside air. Thus, hot-gas heater function is only set to the front evaporator 32 of the front air conditioning unit 30, so that heating performance of the front air conditioning unit 30 is effectively enhanced to cover its thermal load.

In this embodiment, the decompression unit 24 is constructed with a fixed throttle such as a capillary tube without a thermal sensing portion. Comparing with the thermal expansion valve, control of a refrigerant flow is undisturbed due to intense heat from the engine 12 and heated air in the engine compartment 29. Thus, the decompression unit 24 can be located near the condenser 20 in the engine compartment 29. As a result, at a position adjacent to the condenser 20, it is possible to join the outlet side of the front decompression unit 24 and the outlet side of the hot-gas bypass passage 18 and to consolidate both to the refrigerant inlet pipe 26. Therefore, as shown in FIG. 2, the hot-gas bypass passage 18 can be provided as a very short passage inside the valve device 14 that is disposed in the vicinity of the condenser 20. Thus, the front evaporator 32 in the passenger compartment 28 and the compartments of the refrigerant cycle in the engine compartment 29 can be connected by the two refrigerant pipes 26, 34. This refrigerant pipe structure is same as a general one without a hot-gas header function, so the refrigerant cycle system having the hot-gas heating function can be readily mounted on a vehicle.

Even if the front cooling decompression unit 24 is constructed with a simple fixed throttle without a thermal sensing portion , the super heating degree of the refrigerant from the outlet of the front evaporator 32 can be controlled to a predetermined value by controlling the amount of liquid refrigerant staying in the gas-liquid separator 23.

A variation in the amount of refrigerant circulating through the refrigerant cycle, due to a variation in the heat load in the cooling mode, can be absorbed by the tank of the gas-liquid separator 23 provided in the condenser 20. Therefore, the gas-liquid separator 35 does not need to set its tank volume for absorbing the variation in the amount of the circulating refrigerant in the cooling mode. Thus, the tank volume of the gas-liquid separator 35 can be set only in consideration of the refrigerant amount needed in the heating mode. Further, the surplus refrigerant in the heating mode can be stored separately in both of the gas-liquid separator 23 and the gas-liquid separator 35. Accordingly, the tank volume of the gas-liquid separator 35 can be greatly reduced (e.g., to ⅓ or less) in comparison with that in a normal accumulator cycle. Thus, the mounting performance of the gas-liquid separator 35 onto the vehicle can be improved.

(Second Embodiment)

Figure 4:
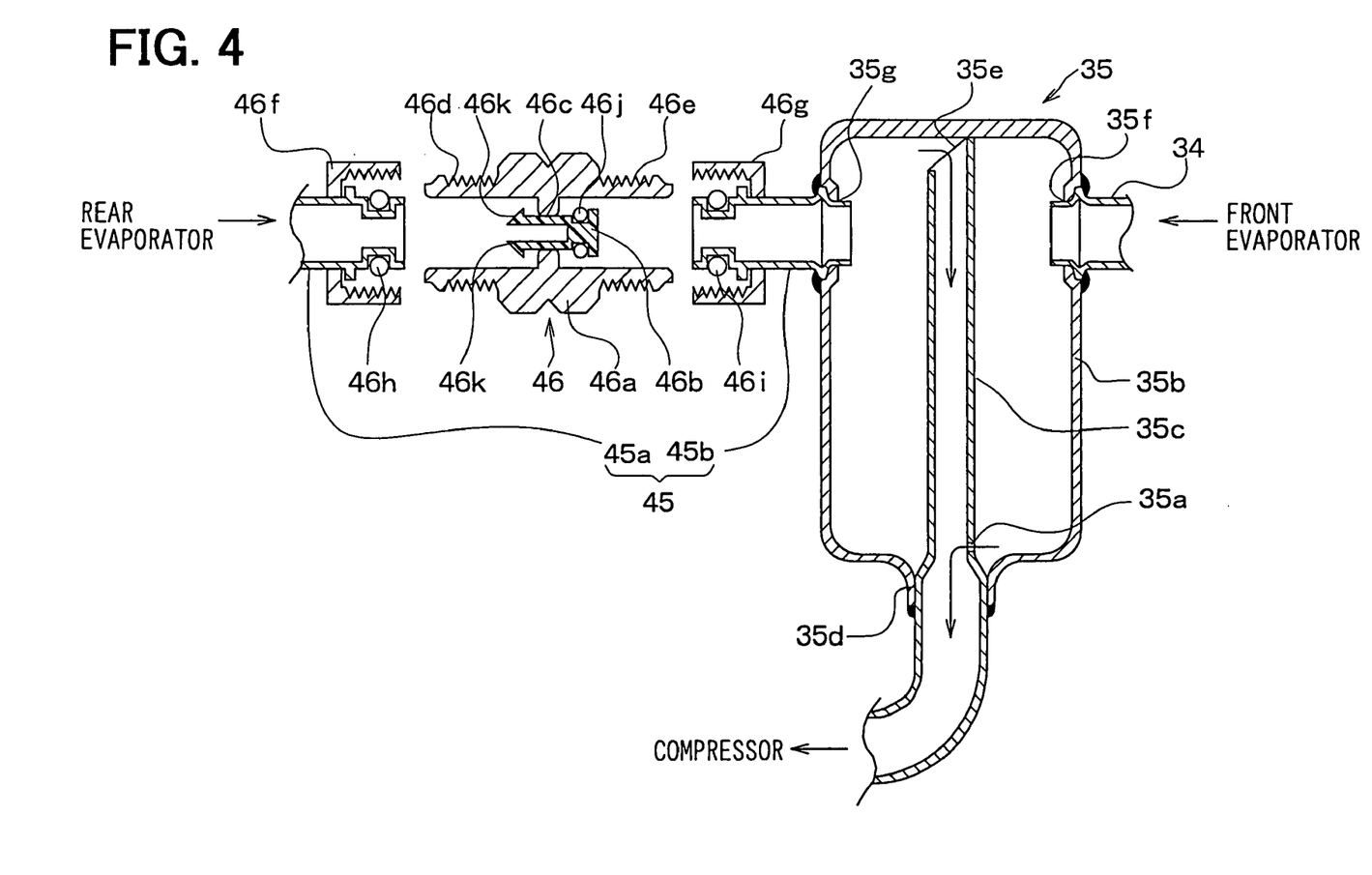
FIG. 4 is a partially exploded cross-sectional view showing a check valve and a low-pressure side gas-liquid separator according to a second embodiment of the present invention.

The second embodiment of the present invention will be now described with reference to FIG. 4. As shown in FIG. 4, in the second embodiment, an outlet piping 35c is inserted into a cylindrical main body 35b of the gas-liquid separator 35. In the outlet piping 35c, a fine throttle hole is opened so as to be used as the liquid return throttle path 35a.

The outlet piping 35c is inserted into the cylindrical main body 35b from a bore portion 35d in the bottom of the cylindrical main body 35b, and is joined integrally to the cylindrical main body 35b around the outlet piping 35c by soldering or the like. In the outlet piping 35c, adjacent to the bottom portion of the cylindrical main body 35b, the liquid return throttle path 35a is formed to suck a liquid refrigerant around the bottom of the cylindrical main body 35b into the outlet piping 35c.

A gas refrigerant inlet 35e is bored in the top end of the outlet piping 35c to suck the gas refrigerant accumulated in upper portion of the cylindrical portion 35b into the outlet piping 35c.

In an upper side of the cylindrical main body 35b, two first and second bore portions 35f, 35g opposite to each other are provided. The front refrigerant outlet pipe 34 of the front evaporator 32 is inserted into the first bore portion 35f, and is integrated to the main body 35b by soldering or the like. Similarly, in the second bore portion 35f, the rear refrigerant outlet pipe 45 from the rear evaporator 42 is inserted and integrated to the main body 35b by soldering or the like. Here, the rear refrigerant outlet pipe 45 is separated into a first piping segment 45a and a second piping segment 45b, and the second piping segment 45b is inserted into the second bore portion 35g. Between the first piping segment 45a and the second piping segment 45b, the check valve 46 is screwed. Specifically, in a cylindrical main body 46a of the check valve 46, a valve body 46b is disposed to move in a refrigerant flow when the passage is opened. On the inner periphery of the cylindrical main body 46a, a ring-shaped seat 46c is formed integrally with the cylindrical main body 46.

On the other peripheries of the two ends of the main body 46a, male thread portions 46d, 46e are formed. To the male thread portions 46d, 46e, the nut members 46f, 46g are screwed. The nut members 46f, 46g are hooked on the peripheries of the piping segments 45a, 45b. Here, O-rings 46h, 46i are attached on the peripheries of the piping segments 45a, 45b to be elastically fitted to the inner peripheries of the main body portion 46a and to seal the joint portions therebetween.

If refrigerant flows reversely from the gas-liquid separator 35 toward the rear refrigerant outlet pipe 45, an O-ring 46j attached on the periphery of the valve body 46b is elastically fitted to the wall of the seat 46c to close the check valve 46, so that a reverse flow of the refrigerant is avoided. On the contrary, when refrigerant flows from the rear refrigerant outlet pipe 45 toward the gas-liquid separator 35, the valve body 46b separates from the seat 46c so that the check valve 46 is opened, and the refrigerant flows through the check valve 46. When the check valve 46 is opened, plural hooking claws 46k, which are formed integrally with the valve body 46b, engaged with the seat 46c so that the displacement of the valve body 46b is regulated.

(Third Embodiment)

Figure 5:
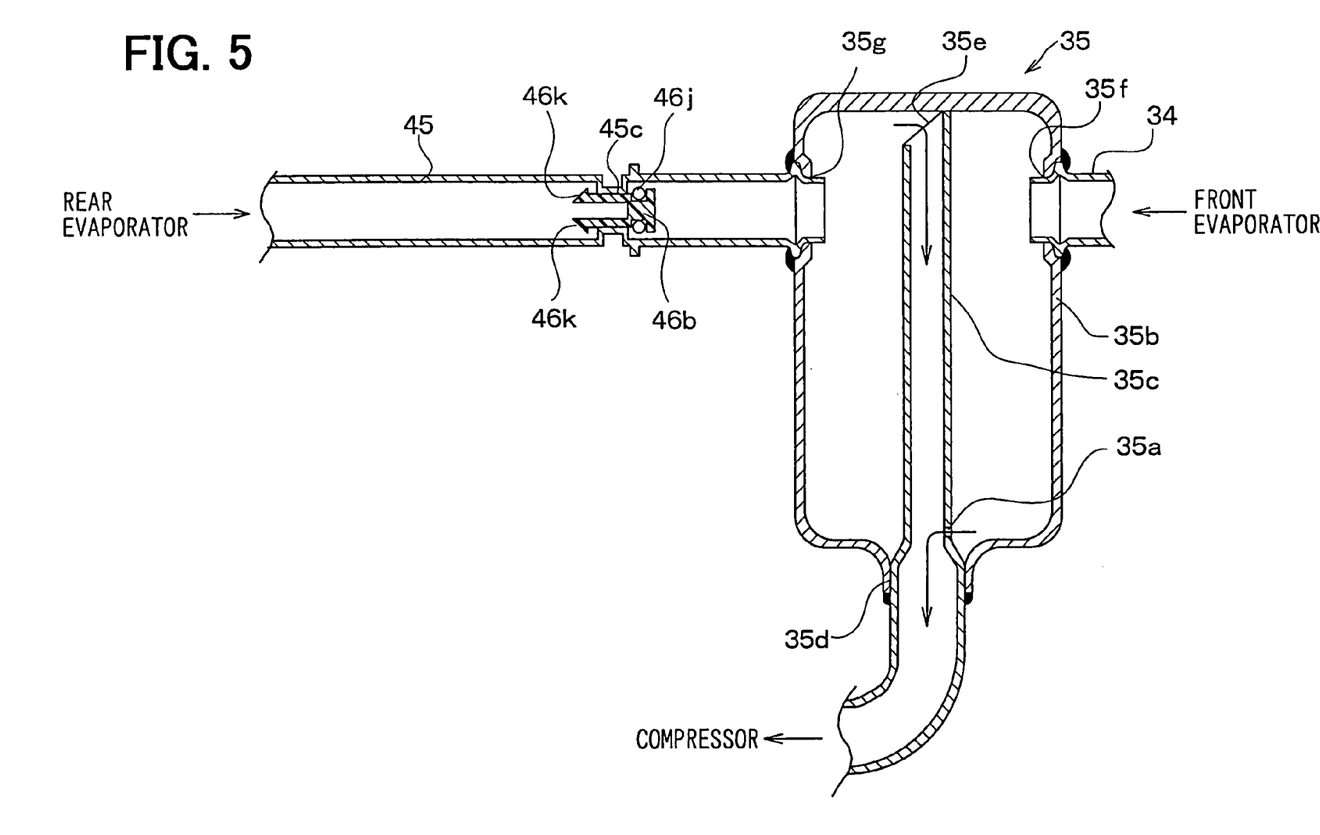
FIG. 5 is a partially exploded cross-sectional view showing a check valve and a low-pressure side gas-liquid separator according to a third embodiment of the present invention.

The third embodiment of the present invention will be now described with reference to FIG. 5. In the third embodiment, as shown in FIG. 5, the structure of the check valve 46 is made simple. In the third embodiment, the rear refrigerant outlet pipe 45 is not divided. At a position adjacent to the downstream end of the rear refrigerant outlet pipe 45, a reduced portion 45c having a reduced passage area is integrally formed, so that the reduced portion 45c is used as the seat 46c described in the second embodiment.

That is, when refrigerant flows reversely from the gas-liquid separator 35 to the rear refrigerant outlet pipe 45 (to the side of the rear evaporator 42), the O-ring 46j attached on the periphery of the valve body 46b is elastically fitted onto the wall of the reduced portion 45c to close the passage. Thus, a reverse flow of the refrigerant is avoided.

On the contrary, when refrigerant flows from the rear refrigerant outlet pipe 45 toward the gas-liquid separator 35, the valve body 46b separates from the seat 46c, and the plural hooking claws 46k are engaged on the seat 45c so as to regulate the position of the valve body 46b.

In the third embodiment, the rear refrigerant outlet pipe 45 does not need to be separated into two portions, so that a threaded joint is not necessary. Therefore, the check valve 46 can be significantly simplified in comparison with the second embodiment.

(Fourth Embodiment)

The fourth embodiment of the present invention will be now described with reference to FIG. 6.

Figure 6:
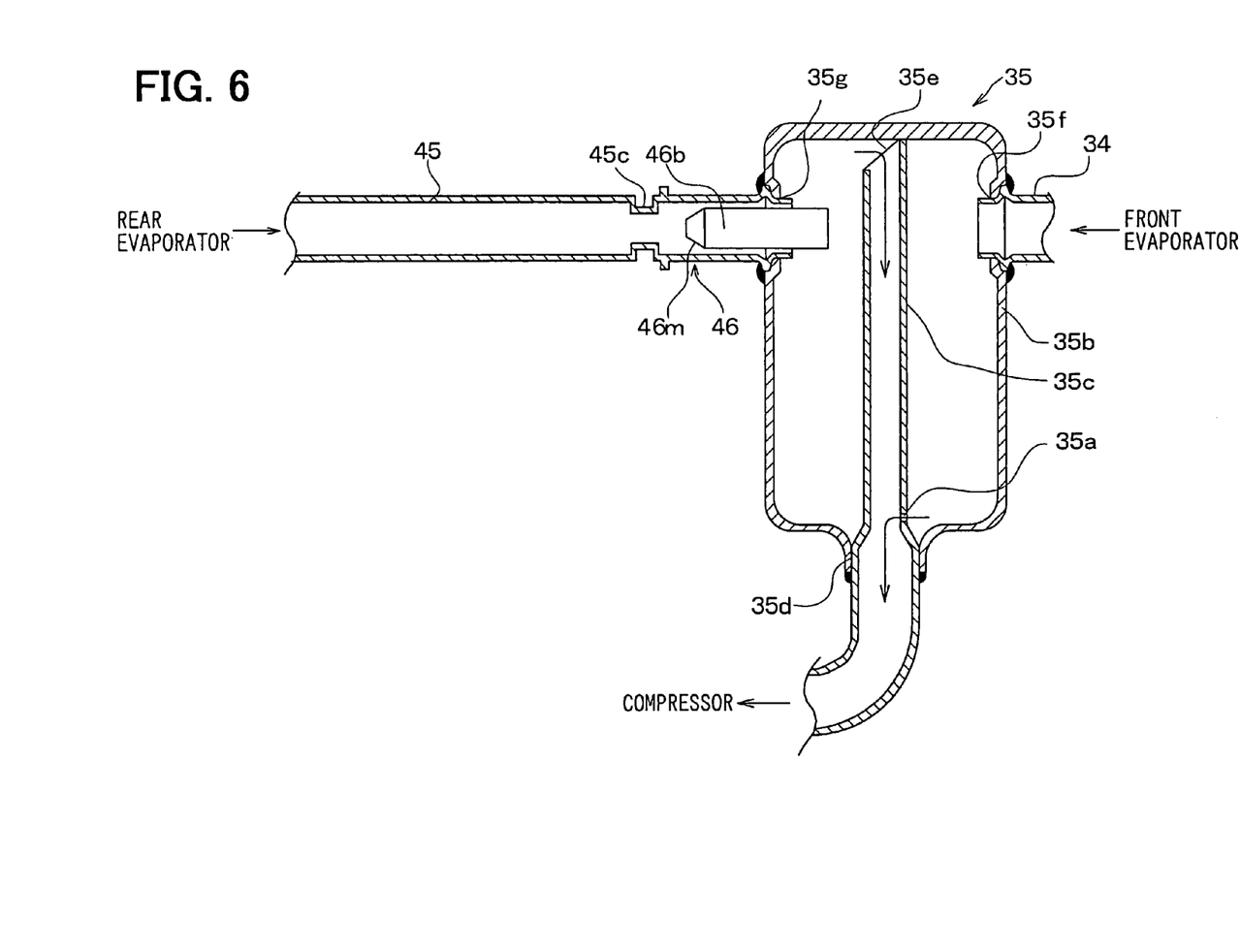
FIG. 6 is a partially exploded cross-sectional view showing a check valve and a low-pressure side gas-liquid separator according to a fourth embodiment of the present invention.

In the fourth embodiment, as shown in FIG. 6, the valve body 46b is formed in an axially lengthened cylinder. A conical end portion 46m of the cylindrical valve body 46b seats onto the wall of the reduced portion 45c so that the passage in the check valve 46 is closed. When the check valve 46 is opened, the valve body 46b moves toward the gas-liquid separator 35, so that the end of the valve body 46b contacts the outlet piping 35c. Thus, the displacement of the valve body 46b is regulated.

In the fourth embodiment, the shape of the check valve 46 becomes simple in comparison with those of the second embodiment and the third embodiment.

Although the present invention has been fully described in connection with the preferred embodiments thereof with reference to the accompanying drawings, it is to be noted that various changes and modifications will become apparent to those skilled in the art.

For example, the fixed throttle in the decompression unit 24 can be used in combination with a variable throttle which changes its opening corresponding to the condition (pressure, temperature) of the high-pressure refrigerant in the outlet (upstream side of the decompression unit) of the condenser 20. Further, a variable throttle can be used instead of the decompression unit 24.

In addition to the thermal expansion valve 43, a solenoid valve can be installed to close a refrigerant distribution into the rear evaporator 42 when the rear evaporator 42 is not used. An electrically driven valve can be used as a means of refrigerant decompression for the rear seat side, so that a refrigerant flow into the rear evaporator 42 can be shut off.

Such changes and modifications are to be understood as being within the scope of the present invention as defined by the appended claims.

What is claimed is:

1. An air conditioner for a vehicle comprising:
   a front air conditioning unit for air-conditioning a front area in a passenger compartment of the vehicle;
   a rear air conditioning unit for air-conditioning a rear area in a passenger compartment;
   a compressor for compressing refrigerant;
   a condenser for condensing gas refrigerant discharged from the compressor in a cooling mode;
   a front evaporator disposed in the front air conditioning unit, for cooling air in the cooling mode and for heating air in a first heating mode;
   a rear evaporator disposed in the rear air conditioning unit for cooling air in the cooling mode;
   a hot-gas bypass passage through which the gas refrigerant discharged from the compressor flows into the front evaporator while bypassing the condenser in the heating mode;
   a front decompression unit, disposed between the condenser and the front evaporator, for decompressing refrigerant flowing from the condenser in the cooling mode;
   a rear decompression unit, disposed between the condenser and the rear evaporator, for decompressing refrigerant flowing from the condenser in the cooling mode;
   a refrigerant pipe to which a refrigerant outlet side of the front decompression unit and a refrigerant outlet side of the hot-gas bypass passage are joined; and
   a low-pressure gas-liquid separator for separating refrigerant into gas refrigerant and liquid refrigerant, the low-pressure gas-liquid separator being coupled to a refrigerant outlet of the front evaporator and a refrigerant outlet of the rear evaporator, the low-pressure gas-liquid separator having a refrigerant outlet portion through which gas refrigerant is introduced to a suction port of the compressor, wherein
   the refrigerant pipe has a refrigerant outlet that is connected to a refrigerant inlet of the front evaporator;
   the condenser includes first and second heat-exchanging units which are disposed in this order in a refrigerant flow direction, and a high-pressure gas-liquid separator disposed between the first heat-exchanging unit and the second heat-exchanging unit for separating refrigerant into gas refrigerant and liquid refrigerant;
the front decompression unit is a fixed throttle;
the high-pressure gas-liquid separator regulates a stored amount of liquid refrigerant in response to a superheating degree of the gas refrigerant discharged from the compressor that is controlled to regulate a superheating degree of the gas refrigerant at an outlet of the front evaporator when at least the front air conditioning unit is operated under the cooling mode;
the rear decompression unit regulates a superheating degree of gas refrigerant at an outlet of the rear evaporator independently from an operation of the front evaporator when the rear air conditioning unit is operated under the cooling mode;
a check valve is disposed between the rear evaporator and the low-pressure gas-liquid separator so as to shut a reverse flow from the low-pressure gas-liquid separator toward the rear evaporator;
the low-pressure gas-liquid separator has a first inlet coupled to the refrigerant outlet of the front evaporator and a second inlet independently formed from the first inlet and coupled to the refrigerant outlet of the rear evaporator; and
the check valve is located adjacent to the second inlet.

2. The air conditioner according to claim 1, further comprising:
an evaporator outlet pipe having one end connected to the refrigerant outlet of the rear evaporator, and the other end connected to the low-pressure gas-liquid separator; wherein:
the evaporator outlet pipe has a wall portion defining a reduced passage area; and
the check valve has a valve body that contacts the wall portion when the reverse flow is shut.

3. The air conditioner system according to claim 2, further comprising:
an engagement portion provided in the valve body, wherein the engagement portion is engaged with the wall portion to regulate an opening degree of the check valve when the valve body is moved to a valve-opening position.

4. The air conditioner according to claim 1, further comprising:
an evaporator outlet pipe including a first pipe portion connected to the refrigerant outlet of the rear evaporator, and a second pipe portion connected to the low-pressure gas-liquid separator; wherein
the check valve is disposed between the first pipe portion and a second pipe portion to be connected therebetween.

5. The air conditioner according to claim 1, wherein:
the refrigerant outlet side of the fixed throttle and the refrigerant outlet side of the hot-gas bypass passage are joined to the refrigerant pipe outside the passenger compartment, and
the refrigerant pipe is piped as a single introducing pipe from refrigerant cycle components outside the passenger compartment to the front air conditioning unit mounted in the passenger compartment.

6. The air conditioner according to claim 5, further comprising a valve device for switching the cooling mode and the heating mode and a joint portion at which the refrigerant outlet side of the fixed throttle and the refrigerant outlet side of the hot-gas bypass passage are joined, wherein the refrigerant pipe extends from the valve device to the front evaporator.

7. The air conditioner according to claim 6, wherein:
the valve device is disposed on the condenser.

8. The air conditioner according to claim 1, further comprising:
a front heater core for providing the front area in a passenger compartment of the vehicle with a second heating mode;
a rear heater core for providing the rear area in the passenger compartment of the vehicle with air conditioning; wherein
the high pressure gas-liquid separator accumulates liquid refrigerant only in the cooling mode;
the rear decompression unit is constructed with a thermal expansion valve connected between the condenser and the rear evaporator;
the low pressure gas-liquid separator accumulates liquid refrigerant only in the heating mode; and
the front decompression unit and the rear evaporator decompression unit are connected to the compressor by a high pressure liquid refrigerant pipe.

9. The air conditioner according to claim 1, wherein the second inlet of the low-pressure gas-liquid separator is provided with the check valve.

10. The air conditioner according to claim 1, wherein:
the low-pressure gas-liquid separator and the check valve are assembled as a single unitary component disposed outside the passenger compartment spaced from the rear evaporator.

11. The air conditioner according to claim 10, wherein the check valve is threaded into the second inlet of the low-pressure gas-liquid separator.

12. The air conditioner according to claim 10, wherein the check valve is integrally provided with the second inlet of the low-pressure gas-liquid separator.

13. An air conditioner for a vehicle comprising:
a front air conditioning unit, including a front evaporator and a front heater core, for providing a front area in a passenger compartment of the vehicle with air conditioning that includes a cooling mode and a heating mode;
a rear air conditioning unit, including a rear evaporator and a rear heater core, for providing a rear area in the passenger compartment of the vehicle with air conditioning;
a compressor for compressing refrigerant;
a condenser for condensing gas refrigerant discharged from the compressor in the cooling mode, the condenser including first and second heat-exchanging units which are disposed in a refrigerant flow direction and a high pressure gas-liquid separator, disposed between the first heat-exchanging unit and the second heat-exchanging unit, for separating refrigerant into gas refrigerant and liquid refrigerant and for accumulating liquid refrigerant only in the cooling mode;
a hot-gas bypass passage through which gas refrigerant discharged from the compressor is introduced into the front evaporator while bypassing the condenser in the heating mode;
a front decompression unit, constructed with a fixed throttle connected to the condenser, for decompressing refrigerant flowing from the condenser in the cooling mode;
a rear decompression unit, constructed with a thermal expansion valve connected between the condenser and the rear evaporator, for controlling the superheating degree of the refrigerant flowing from the rear evaporator in the cooling mode;

a refrigerant pipe connecting the front decompression unit, the hot-gas bypass passage and the front evaporator;

a low pressure gas-liquid separator connected to refrigerant outlets of the front and rear evaporators and to a refrigerant suction port of the compressor for separating refrigerant into gas refrigerant and liquid refrigerant and for accumulating liquid refrigerant only in the heating mode; and outlet pipe means for respectively connecting the refrigerant outlets of the front and rear evaporators to the low pressure gas-liquid separator, wherein the outlet pipe means comprises a check valve that prevents the refrigerant flowing from the low pressure gas-liquid separator toward the rear evaporator;

a check valve is disposed between the rear evaporator and the low-pressure gas-liquid separator so as to shut a reverse flow from the low-pressure gas-liquid separator toward the rear evaporator;

the low-pressure gas-liquid separator has a first inlet coupled to the refrigerant outlet of the front evaporator and a second inlet independently formed from the first inlet and coupled to the refrigerant outlet of the rear evaporator; and the check valve is located adjacent to the second inlet.

14. An air conditioner for a vehicle, comprising:

a compressor for compressing refrigerant;

a condenser for condensing gas refrigerant discharged from the compressor in a cooling mode;

a front evaporator for providing a front area in a passenger compartment of the vehicle with cool air in the cooling mode and warm air in a heating mode;

a rear evaporator for providing a rear area in the passenger compartment of the vehicle with cool air in the cooling mode;

a hot-gas bypass passage through which the gas refrigerant discharged from the compressor flows into the front evaporator while bypassing the condenser in the heating mode;

a low-pressure gas-liquid separator for separating refrigerant into gas refrigerant and liquid refrigerant, the low-pressure gas-liquid separator being coupled to a refrigerant outlet of the front evaporator and a refrigerant outlet of the rear evaporator, the low-pressure gas-liquid separator having a refrigerant outlet through which gas refrigerant is introduced to a suction port of the compressor; and a check valve disposed between the rear evaporator and the low-pressure gas-liquid separator to shut a reverse flow from the low-pressure gas-liquid separator toward the rear evaporator, wherein:

the low-pressure gas-liquid separator has a first inlet coupled to the refrigerant outlet of the front evaporator, and a second inlet provided at a position separated from the first inlet and coupled to the refrigerant outlet of the rear evaporator; and the check valve is disposed adjacent to the second inlet.

15. The air conditioner according to claim 14, wherein the low-pressure gas-liquid separator and the check valve are assembled as a single unitary component disposed outside the passenger compartment spaced from the rear evaporator.

16. The air conditioner according to claim 15, wherein the check valve is threaded into the second inlet of the low-pressure gas-liquid separator.

17. The air conditioner according to claim 15, wherein the check valve is integrally provided with the second inlet of the low-pressure gas-liquid separator.

* * * * *